J. W. KOHLHEPP.
CARCASS SCRAPING AND POLISHING MACHINE.
APPLICATION FILED JULY 1, 1907.
1,012,654.
Patented Dec. 26, 1911.
2 SHEETS—SHEET 1.
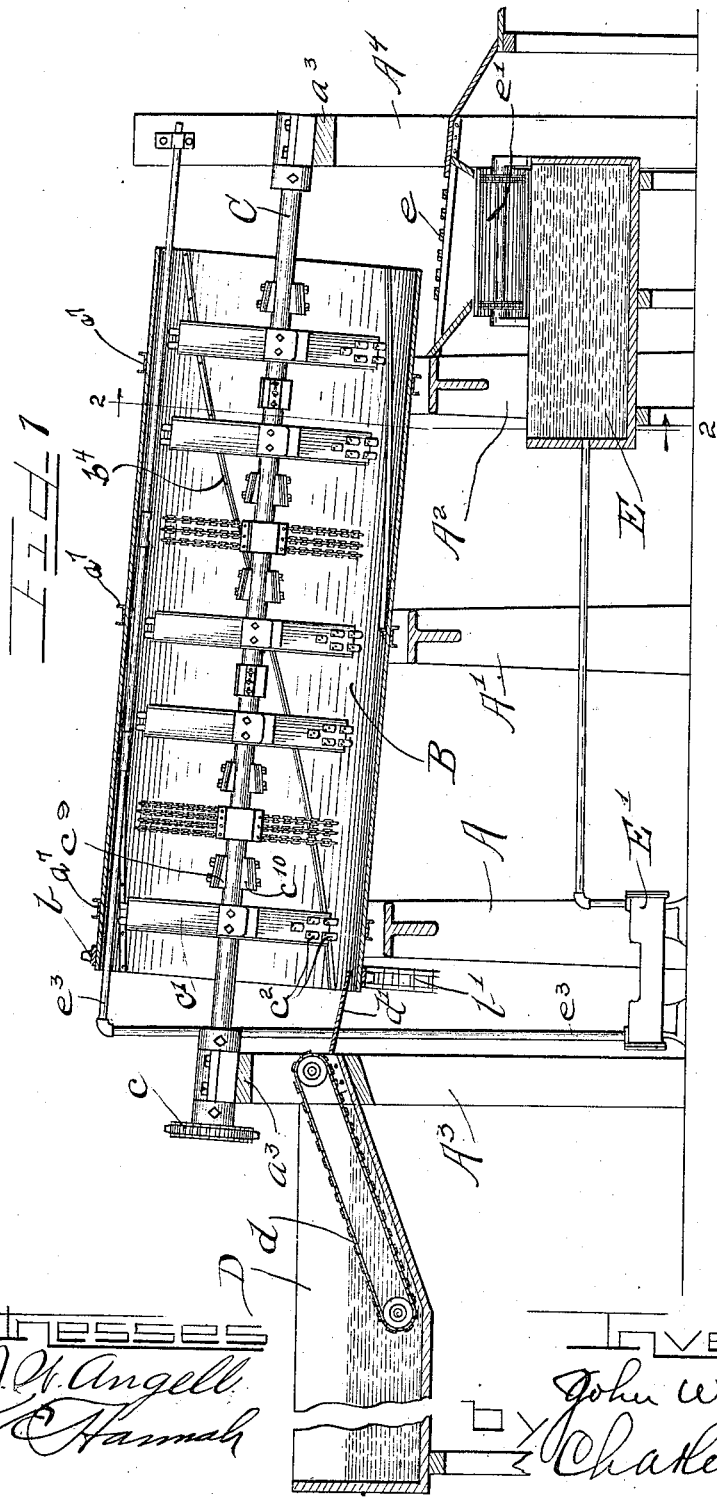

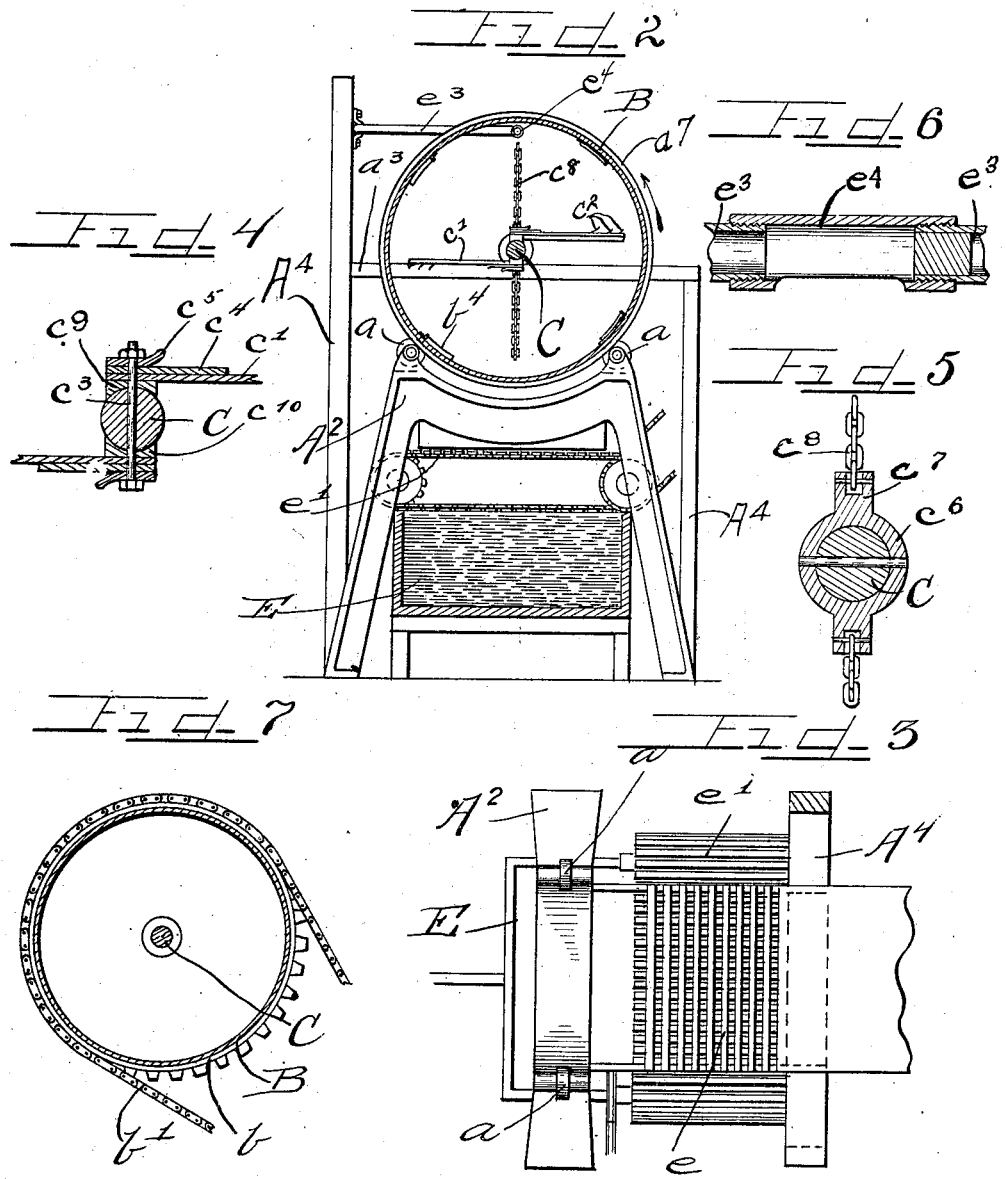

UNITED STATES PATENT OFFICE.

JOHN W. KOHLHEPP, OF CHICAGO, ILLINOIS.

CARCASS SCRAPING AND POLISHING MACHINE.

1,012,654.  Specification of Letters Patent.  Patented Dec. 26, 1911.

Application filed July 1, 1907. Serial No. 381,815.

*To all whom it may concern:*

Be it known that I, JOHN W. KOHLHEPP, a citizen of the United States, and a resident of Chicago, Cook county, Illinois, have invented certain new and useful Improvements in Carcass Scraping and Polishing Machines; and I do hereby declare that the following is a full, clear, and exact description of the same, reference being had to the accompanying drawings, and to the letters of reference marked thereon, which form a part of this specification.

This invention relates to improvements in carcass scraping and polishing machines of that class in which the carcasses are delivered past and in operative relation with beaters and scrapers, and are turned or rotated while operated on by said beaters and scrapers.

The invention belongs to the same class as my prior inventions set forth in my applications for patents filed on the 18th day of May, 1906, Serial No. 317,451, and on the 29th day of March, 1907, Serial No. 365,416. In those applications the carcasses were suspended and moved past rotative beaters and scrapers and rotated during their passage and the object of this invention is to provide a scraping and polishing device adapted for use for large or small butchering establishments. In either event the carcasses are passed substantially horizontally through the machine and mechanically rotated while operated upon by the beaters.

It is a further object of the invention to provide mechanism for rotating the carcasses during their passage along the beaters thereby bringing all parts of the carcasses into position to be thoroughly cleaned and polished.

It is a further object of the invention to provide a casing or receptacle to confine the steam or vapor due to the scalding of the carcasses and to jet upon the carcasses a hot spray during the scraping and polishing operation.

Finally it is an object of this invention to provide an exceedingly cheap, simple, durable and effective mechanism of the class described capable of operating effectively upon a single carcass while passing therethrough, or as effectively operating upon a continuous line of carcasses delivered comparatively rapidly therethrough.

The invention embraces many novel features and consists of the matters hereinafter defined and more fully pointed out in the drawings.

In the drawings: Figure 1 is a vertical longitudinal section of a device embodying my invention. Fig. 2 is a section thereof on line 2—2 of Fig. 1. Fig. 3 is a fragmentary top plan view of the chute for receiving the carcasses from the machine and the conveyer for delivering the hair and other refuse laterally. Fig. 4 is an enlarged transverse section of the beater shafts. Fig. 5 is a similar view showing chains employed as beaters. Fig. 6 is an enlarged detail of one of the spray pipes. Fig. 7 is a transverse section with parts omitted and illustrating the drive for the cylinder.

As shown on the drawings: A, A' and $A^2$ indicate frame members or standards constructed of cast metal or any suitable material and as shown, each affording at the top on opposite sides thereof bearings for rollers $a$ upon which is supported a cylinder B of relatively large size in which rotates the beater shaft C and through which in operative relation with the beater shaft, the carcasses are successively passed. Said standards are of a height to support said cylinder with its discharge or rear end lower than its receiving end, and as shown extending peripherally around the cylinder in position to receive the rollers therein are channels $a^7$ which by engagement at each end of said rollers act to hold the cylinder from horizontal movement while rotating.

At the receiving end of the cylinder is provided a peripheral rim $b$ having sprocket teeth thereon adapted to be engaged by a sprocket chain $b'$ and driven from any suitable source of power and whereby the cylinder is rotated at a comparatively slow rate of speed. At each end of said cylinder are posts $A^3$ and $A^4$ connecting which horizontally are beams $a^3$ on which is journaled the beater shaft C. As shown in Fig. 1 the beater shaft at the forward or receiving end of the cylinder is provided with a sprocket wheel $c$ of a size to permit the beater shaft to be rotated in the same or opposite direction to the rotation of the cylinder but at a much higher rate of speed. Within the cylinder as shown are inclined angle iron ribs $b^4$ which extend spirally around the same to assist in delivering carcasses therethrough. The rate of delivery of course is determined by the rate of rotation of the cylinder, the pitch of said ribs and to an extent by the arrangement of the beaters.

Rigidly but removably secured on the shaft C are the beaters, one form of which is shown in Fig. 4 and another in Fig. 5. That shown in Fig. 4 comprises a plurality of sections of cotton or other suitable belting of such ply and width as to afford a very stiff section. Said sections $c'$ are of a length to extend to near the inner periphery of the cylinder and are provided with scrapers $c^2$ on the end thereof preferably directed in the direction of the rotation of the carcasses. A bolt $c^3$ extends through said shaft through facing blocks $c^9$—$c^{10}$ and through a relatively short section of the belting $c^4$ and a washer $c^5$ rigidly binding all to the shaft. Said washer $c^5$ as shown is a casting or plate one end of which projects toward the scraping end of the blade and is curved outwardly, as shown in Fig. 4, so that the belt when bent backwardly in striking is resisted by the short belt section $c^4$ and said bent end of the washer preventing a short bend thus tending to prevent the belt from breaking. In the construction shown in Fig. 5 a collar $c^6$ is secured on the shaft in any suitable manner and is provided with oppositely directed lugs $c^7$ to which are secured a plurality of chains $c^8$ which are of the same length as the beater or belt sections and serve substantially the same purpose. Conveniently also the facing blocks $c^9$—$c^{10}$ are tapered toward the discharge end of the cylinder, thus inclining the belt transversely thereof in the direction of the length of the cylinder and in consequence to a certain extent striking the carcasses in a manner to assist in propelling them toward the discharge end.

The tank D may be directed in any suitable manner for scalding purposes and supplied with water of a suitable temperature in any suitable manner. Extending thereinto and driven continuously or in any suitable manner is the belt conveyer $d$ which elevates the carcasses from the tank D and delivers the same thereover down the chute $d'$ into the cylinder. At the discharge end of the tank is a chute $e$ which inclines from the cylinder and the end of which adjacent the cylinder is constructed of a plurality of slats spaced a sufficient distance apart to permit the hair and other refuse to fall therethrough as the hog slides down the incline. Extending transversely the cylinder beneath the slide is a belt conveyer $e'$ operated continuously in a suitable manner and which acts to convey the hair and other refuse laterally from the machine. Beneath the conveyer positioned to receive the water driven from the cylinder and through the slats, and conveyer, is the tank E supplied with hot water in any convenient manner. This tank is piped to a force pump E' from which discharge pipe $e^3$ extends upwardly and into the cylinder and longitudinally therof, and is provided as shown with perforated sections $e^4$ through which the spray is worked upon the carcass in the bottom of the cylinder.

The operation is as follows: By the use of considerable power the cylinder and the shaft are rotated continuously and the conveyers $d$ and $e'$ are also continuously driven. The cylinder is driven peripherally and the beater shaft rotated in the same or opposite direction, the cylinder however, rotating much more slowly than the beater shaft as the carcasses are carried upwardly on one side of the cylinder the ribs $b^4$ therein assisting in turning the carcasses against the action of the beaters or with the action of the beaters depending upon the rotation of the cylinder. The carcass as rotated is of course exposed to the action of the beaters and scrapers on the shaft and the inclined webs or beaters serve together with the spiral ribs and the inclination of the cylinder to force the carcasses to the delivery end. Of course it is quite immaterial so far as the operation of the machine is concerned if but a single hog is within the cylinder, or if the carcasses lie in continuous lines each close to the other and of course it will be evident that the scraping and polishing effect on the carcasses will be the same if one or many are delivered therethrough in a given time. Of course too, the rate of travel through the cylinder may be increased if the cylinder is lengthened and for small slaughter houses or where but few carcasses are operated upon in a day, a comparatively short cylinder may be used and the carcasses delivered therethrough more slowly.

Of course it is evident that details of construction may be varied and I have not attempted to show more than one manner of embodying my invention. I therefore do not purpose limiting this application for patent otherwise than necessitated by the prior art.

I claim as my invention:

1. In a hog scraper a cylinder for loosely supporting a carcass and conveying and continuously rotating the carcass, flexible beaters for acting upon the loosely turning carcass as it moves longitudinally therepast and means for supporting and actuating said flexible beaters.

2. A machine for cleaning and polishing hogs comprising a rotative shaft, a rotatable casing concentric with said shaft and through which the carcasses pass, flexible scraping means on said shaft for dehairing the carcass, chains on said shaft adapted to coöperate with the scraping means in removing the bristles or hair from the carcass and adapted to polish said carcass and means for delivering a scalding jet upon the carcasses during the dehairing and polishing operations.

3. A scraping device comprising a rotatable cylinder adapted to convey a carcass therethrough, to loosely support the carcass and continuously rotate the same, and beating and scraping mechanism non-connected with the cylinder and located centrally in the cylinder adapted to act on a carcass loosely supported in the cylinder.

4. In a machine of the class described a receptacle having an inclined bottom, an inclined shaft rotative in the receptacle, scraping means on said shaft, an elevator acting to deliver the carcasses into the receptacle, a chute to receive the carcasses from the receptacle and means spraying the carcasses during their passage through the receptacle.

5. In a machine of the class described the combination with a movable receptacle inclined longitudinally and means for supporting the same, of a rotative shaft inclined in and similarly to the receptacle, beaters secured on said shaft extending to near the periphery of the receptacle, means delivering carcasses into the receptacle into operative relation with the beaters, said receptacle acting conjointly with the beaters to deliver the carcasses therethrough.

6. A hog dehairing machine comprising a rotatable cylinder for advancing the carcass, and scraping devices contained in said cylinder.

7. In a machine of the class described the combination with the rotative shaft of flexible beaters thereon, a rotative cylinder inclosing the shaft, means for rotating the shaft and cylinder simultaneously, means delivering carcasses to be treated into said cylinder in operative relation with the beaters and ribs in said cylinder acting to rotate the carcass and deliver the same therethrough.

8. A carcass cleaning and polishing machine embracing a rotative cylinder into which the carcasses are delivered, means rigidly engaged to the cylinder for moving the carcasses longitudinally thereof, rotatable beating mechanism positioned centrally in the cylinder and acting centrifugally to whip the bristles and scurf from the carcasses and means for spraying fluid upon the carcasses to clean the same and to remove the bristles and scurf from the cylinder.

9. In a device of the class described an inclined rotatable cylinder adapted to support and move a carcass longitudinally therethrough, and centrifugally acting beating mechanisms acting to clean and to assist in advancing the carcasses through the cylinder.

10. In a device of the class described a cylinder inclined at an angle with the horizontal adapted to loosely support a carcass in the bottom thereof and to convey the same therethrough, means rotatable with the cylinder to aid in rotating the carcass, a beater shaft in the cylinder inclined at an angle with the horizontal and mechanism thereon for scraping and beating the bristles and scurf from the carcasses.

11. In a carcass cleaning and polishing machine a rotatable casing, spiral means in the casing adapted to aid in continuously rotating the carcasses and to move them longitudinally through the cylinder, a shaft extending centrally through the casing, coacting chains and scraping mechanisms on said shaft adapted to act on the continuously rotating carcasses as passed through the cylinder and a spraying mechanism in the cylinder adapted to continuously deliver fluid upon the carcasses.

12. In a device of the class described an inclined cylinder, means for rotating the same, means rotatable with the cylinder adapted to move the carcasses longitudinally therethrough and to continuously rotate the carcasses, a shaft extending through the cylinder and beaters thereon inclined at an angle with the shaft.

13. In a device of the class described a cylinder for supporting and continuously rotating carcasses, a shaft, centrifugally acting beating and scraping mechanism thereon and means inclining the scraping mechanisms at an angle with the axis of the cylinder.

14. In a device of the class described an inclined cylinder, means for rotating the same, coacting rotating mechanisms, one rigidly secured to the cylinder acting to move carcasses longitudinally through the cylinder and to aid in rotating said carcasses, the other mechanism adapted to aid in rotating the carcasses and to remove the bristles and refuse therefrom, and stationary means in the cylinder adapted to supply fluid to wash the carcasses.

15. In a device of the class described the combination with a cylinder for loosely supporting a carcass and continuously rotating and moving the same forwardly of scraping mechanisms for acting from the center of the cylinder outwardly on the carcass embracing a shaft, flexible beater arms thereon, and polishing chains rigidly secured on the shaft between part of the beater arms.

16. In combination a cylinder, rotatable flexible polishing members within the cylinder, a rotary flexible scraper also within the cylinder in advance of the polishing member and means for rotating the scraper and the polishing member.

17. In combination a cylinder, rotatable flexible polishing members within the cylinder, a rotary flexible scraper also within the cylinder in advance of the polishing members and means for rotating the scraper and the polishing members about the same axis.

18. In combination a rotatable cylinder, a rotatable polishing member within the cylinder, a flexible scraper also within the cylinder in advance of the polishing member and rotatable about the same axis, means for rotating the cylinder and means for rotating the polishing member and the scraper in a direction opposed to the direction of rotation of the cylinder.

19. In combination a rotatable cylinder, a shaft journaled within the cylinder, a polishing member secured to the shaft within the cylinder and for rotation therewith, a flexible scraper also secured to the shaft within the cylinder and for rotation therewith, means for rotating the shaft and means for rotating the cylinder in a direction opposed to the direction of rotation of the shaft.

20. In a hog scraping machine the combination of a rotatable cylinder, a rotatable polishing member within the cylinder, a flexible scraper also within the cylinder and rotatable about the same axis as the polishing member, means for rotating the cylinder, means for rotating the polishing member and scraper in a direction opposed to the direction of rotation of the cylinder and means within the cylinder for tumbling the carcass during the rotation of the scraper and polishing member.

21. The combination of an axially rotatable spiral conveying element comprising spaced convolutions and scrapers operatively related to the said element and rotatable about the same axis.

22. In a hog scraping machine the combination of a cylinder, means for rotating the cylinder, an independently rotatable flexible scraper within the cylinder, and means for rotating the scraper.

23. In a hog scraping machine the combination of a cylinder, means for rotating the cylinder, an independently rotatable flexible scraper within the cylinder, and means for rotating the scraper in a direction opposed to the direction of rotation of the cylinder.

24. In a hog-dehairing machine, a conveyer including a rotatable element for advancing the carcass and scraping devices movable about the same axis.

25. In combination in a hog scraping machine including conveying and scraping mechanism, an open rotatable cylinder for receiving the carcass from the conveyer, means for rotating the cylinder, flexible polishing members supported within the cylinder and for independent rotation with relation thereto, and means for rotating the said members.

26. In a hog-dehairing machine, in combination, power driven and rotarily acting flexible scraper mechanism, and coöperatively power driven and rotarily acting conveyer mechanism adapted to freely and completely support the carcass and at the same time roll it laterally and advance it longitudinally while presenting it to the simultaneous dehairing action of the scraper mechanism, said carcass being free of any grappling to the advancing means, substantially as specified.

27. In a hog dehairing machine, in combination, power driven and rotarily acting flexible scraper mechanism provided with revolubly sweeping beaters, and coöperatively power driven and rotarily acting conveyer mechanism adapted to freely and completely support the carcass and at the same time roll it laterally and advance it longitudinally while presenting it to the simultaneous dehairing action of the scraper mechanism, said carcass being free of any grappling to the advancing means, substantially as specified.

In testimony whereof I have hereunto subscribed my name in the presence of two subscribing witnesses.

JOHN W. KOHLHEPF

Witnesses:
  C. W. Hills,
  K. E. Hannap